United States Patent
Hammerle et al.

(10) Patent No.: US 7,225,613 B2
(45) Date of Patent: Jun. 5, 2007

(54) DIESEL ENGINE AFTER TREATMENT DEVICE FOR CONVERSION OF NITROGEN OXIDE AND PARTICULATE MATTER

(75) Inventors: Robert Hammerle, Franklin, MI (US); Christine Lambert, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/905,915

(22) Filed: Jan. 26, 2005

(65) Prior Publication Data

US 2006/0162323 A1    Jul. 27, 2006

(51) Int. Cl.
*F01N 3/00* (2006.01)

(52) U.S. Cl. ............ 60/297; 60/274; 60/301; 60/311; 422/170; 422/177; 502/150; 502/340; 502/439

(58) Field of Classification Search ........... 60/274, 60/286, 295, 297, 301, 303, 311; 55/DIG. 30; 422/170, 171, 177, 182
See application file for complete search history.

(56) References Cited

U.S. PATENT DOCUMENTS

| | | | |
|---|---|---|---|
| 5,069,697 A | | 12/1991 | Hamaguchi et al. |
| 5,213,781 A | * | 5/1993 | Abe et al. ............ 423/239.1 |
| 5,863,311 A | * | 1/1999 | Nagai et al. ............ 55/483 |
| 5,974,791 A | * | 11/1999 | Hirota et al. ............ 60/276 |
| 6,038,854 A | * | 3/2000 | Penetrante et al. ........ 60/297 |
| 6,182,443 B1 | | 2/2001 | Jarvis et al. |
| 6,314,722 B1 | * | 11/2001 | Matros et al. ............ 60/274 |
| 6,367,246 B1 | * | 4/2002 | Hirota et al. ............ 60/295 |
| 6,427,436 B1 | | 8/2002 | Allansson et al. |
| 6,572,682 B2 | | 6/2003 | Peter et al. |
| 6,594,991 B2 | | 7/2003 | Itoh et al. |
| 6,615,580 B1 | | 9/2003 | Khair et al. |
| 6,681,566 B2 | | 1/2004 | Itoh et al. |
| 6,823,660 B2 | * | 11/2004 | Minami ............... 60/280 |
| 6,826,906 B2 | * | 12/2004 | Kakwani et al. ......... 60/303 |
| 6,840,976 B2 | * | 1/2005 | Vance et al. ............ 55/523 |
| 6,921,594 B2 | * | 7/2005 | Huang et al. ............ 429/16 |
| 7,122,612 B2 | * | 10/2006 | Tao et al. ............ 526/317.1 |
| 2001/0027645 A1 | | 10/2001 | Itoh et al. |
| 2001/0033910 A1 | * | 10/2001 | Ikeshima ............ 428/116 |
| 2002/0044897 A1 | | 4/2002 | Kakwani et al. |
| 2003/0113242 A1 | | 6/2003 | Hepburn et al. |
| 2004/0067176 A1 | * | 4/2004 | Pfeifer et al. ............ 422/177 |
| 2004/0077494 A1 | * | 4/2004 | LaBarge et al. .......... 502/303 |
| 2004/0079060 A1 | | 4/2004 | Alward |
| 2004/0079631 A1 | | 4/2004 | Birckigt et al. |

(Continued)

FOREIGN PATENT DOCUMENTS

EP    1 003 958 B1    10/2002

(Continued)

*Primary Examiner*—Tu M. Nguyen
(74) *Attorney, Agent, or Firm*—Damian Porcari; Brooks Kushman P.C.

(57) ABSTRACT

An automobile exhaust filter that both traps particulates while altering the concentration of one or more gaseous species is provided. This dual functionality is combined in a single device by utilizing a reactive material that simultaneously alters gaseous component concentration while filtering out particulate material. The automobile exhaust filter is suitable for inclusion in the exhaust of a diesel-powered vehicle. A method utilizing the automobile exhaust catalyst is also provided.

28 Claims, 1 Drawing Sheet

U.S. PATENT DOCUMENTS

2005/0031514 A1* 2/2005 Patchett et al. .......... 423/239.2
2005/0137079 A1* 6/2005 LaBarge .................... 502/150

FOREIGN PATENT DOCUMENTS

| | | |
|---|---|---|
| EP | 1 365 117 A2 | 11/2003 |
| JP | 06033735 A | 2/1994 |
| JP | 2002227688 A | 8/2002 |
| JP | 2002276337 A | 9/2002 |
| JP | 20022339730 A | 11/2002 |
| JP | 2003286877 A | 10/2003 |
| JP | 2004-060494 | 2/2004 |
| WO | WO 95/02655 | 1/1995 |
| WO | WO 95/02655 A1 | 1/1995 |
| WO | WO 02/16014 A1 | 2/2002 |
| WO | WO 02/077425 A1 | 10/2002 |
| WO | WO 03/031780 A1 | 4/2003 |
| WO | WO 03/054364 A2 | 7/2003 |
| WO | WO 03/068362 A1 | 8/2003 |

\* cited by examiner

DIESEL ENGINE AFTER TREATMENT DEVICE FOR CONVERSION OF NITROGEN OXIDE AND PARTICULATE MATTER

BACKGROUND OF THE INVENTION

1. Field of the Invention

The present invention is related to automobile exhaust particulate filters, and in particular to automobile particulate filters that are used in diesel-powered automobiles.

2. Background Art

Emissions of nitrogen oxide ("$NO_x$") and particulate matter ("PM") are of primary concern for both diesel and gasoline vehicles to meet future emissions standards. Diesel vehicles have significant advantages over their gasoline counterparts including a more efficient engine, higher fuel economy, and lower emissions of HC, CO, and $CO_2$. For example, diesel vehicles potentially have a 40% higher fuel economy than current gasoline vehicles with 20% lower $CO_2$ emissions.

Aftertreatment systems for diesel engines typically use separate devices for reduction of $NO_x$ and particulate matter emissions to meet regulatory standards. For example, a filter composed of a ceramic monolith traps PM and the PM is oxidized on a periodic basis. The PM is trapped by plugging every other channel of the filter substrate with nonporous material thereby forcing the exhaust gas through the filter wall. Typical ceramics used to make the filter substrate are cordierite and silicon carbide.

Available technologies for $NO_x$ reduction in lean environments include Selective Catalytic Reduction ("SCR"), in which $NO_x$ is continuously removed through active injection of a reductant over a catalyst and Lean $NO_x$ Traps (LNT), which are materials that adsorb $NO_x$ under lean conditions and must be periodically regenerated by running under rich conditions. SCR technologies utilizing an ammonia-based reductant, such as aqueous urea, have shown potential in achieving high $NO_x$ conversion with minimal fuel economy penalty. Moreover, Selective Catalytic Reduction with ammonia as the reductant has been used extensively for stationary source $NO_x$ control. The high selectivity of ammonia for reaction with $NO_x$ in high $O_2$ environments makes SCR attractive for use on diesel vehicles. Compared to ammonia, aqueous urea is much easier to use onboard a vehicle. SCR catalysts are typically composed of a ceramic flow-through monolith with washcoat or a solid catalyst extrudate. Base metal/zeolites are preferred for vehicle applications due to their superior performance at the exhaust gas temperatures of diesel vehicles and high temperature durability.

Although, current SCR devices and PM filter work reasonably well, separate $NO_x$ and PM devices increase system complexity and system cost. Moreover, thermal management of the separate systems is more difficult and negatively impacts fuel economy.

Accordingly, there exists a need for improved SCR and PM devices with reduced system complexity and increased fuel economy.

SUMMARY OF THE INVENTION

The present invention overcomes one or more problems of the prior art by providing in one embodiment an automobile filter that removes particulate material in an automobile exhaust while altering the concentration of one or more automobile exhaust gas components. The automobile filter of the invention accomplishes this dual functionality in a single device by utilizing a reactive material that simultaneously alters gaseous component concentration while filtering out particulate material. Specifically, the automobile filter of the invention includes as a minimum an exhaust entrance, an exhaust exit, and a filter wall interposed between the entrance and exit. Although, the filter of the invention may function with only a portion of the filter wall comprising the reactive material, it is advantageous and most efficient that the entire interposed filter wall be composed of the reactive material. The automobile exhaust filter of the invention is advantageously incorporated into the exhaust system of an internal combustion automobile, and in particular the exhaust system of a diesel powered automobile. In order to maximize surface area of the filter the filter will include numerous channels through which the automobile exhaust may enter and numerous channels from which the automobile exhaust exits. In such multichannel configurations, a plurality of filter walls will be interposed between the entrance and exit channels. The combined design of the automobile exhaust filter of the invention improves thermal management, increases fuel economy, and possesses higher $NO_x$ reduction while having a lower system cost and complexity.

In a variation of the invention, $NO_x$ and PM functionality are combined into one substrate. Such a combination may be accomplished, for example, by fabricating a diesel particulate filter (DPF) out of $NO_x$ reduction catalyst itself. Incorporation of the filter of the present invention offers numerous advantages over current filter technology. For example, diesel particulate filter ("DPF") may now be located much closer to the engine than if it was downstream of the $NO_x$ catalyst. This saves fuel when the DPF is regenerated. Second, there is more $NO_x$ catalyst volume because it is no longer a washcoat on an inert ceramic substrate because it is the substrate. This results in higher $NO_x$ conversion levels at the higher exhaust flow rates. Third, the exhaust gas flow is now through the wall of the $NO_x$ catalyst, creating more contact between the gas and the catalyst and improving $NO_x$ conversion.

In another embodiment, a method of removing particulate material and altering the concentration of at least one gaseous chemical species in the exhaust is provided. The method of the invention comprises contacting the automobile exhaust with the filter set forth above.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The term "bulk region" as used herein refers to interior regions of an article. The bulk region excludes the surface of the article. The properties of the bulk region may or may not be homogenous when averaged for a macroscopic region (i.e., the properties may or may not depend upon position).

The term "surface region" as used herein refers to exterior regions of the article.

In one embodiment of the present invention, an automobile exhaust filter that removes particulate matter from an automobile exhaust and alters the gas phase concentrations is provided. Typically, the automobile exhaust that the filter of the present invention is exposed to includes both particulate matter (i.e., soot) and gaseous components (i.e., uncombusted fuel, nitrogen oxides, sulfur oxides, carbon monoxide, carbon dioxide, and the like).

Figure 1:
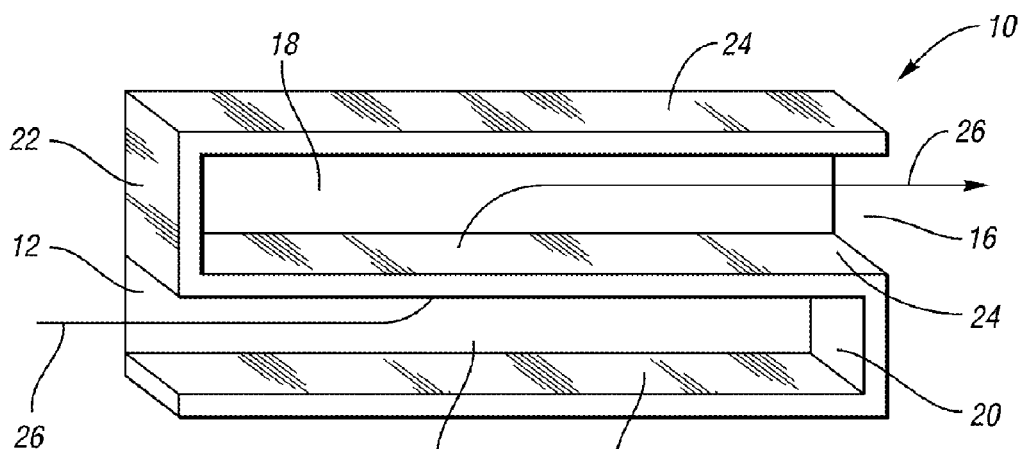
FIG. 1 is a schematic of the automobile exhaust filter of the invention.

With reference to FIG. 1, a schematic of the automobile exhaust filter of the invention is provided. Automobile exhaust filter 10 includes exhaust gas entrance 12 into which engine exhaust gases enter automobile exhaust filter 10 and flow through channel 14. Automobile exhaust filter 10 also includes exhaust gas exit 16 through which the engine exhaust gases exit automobile exhaust filter 10 after flowing through channel 18. Channel 14 is capped on an end with wall 20, and channel 18 is capped on an end with wall 22. Filter wall 24 is interposed between exhaust gas entrance 12 and exhaust gas exit 14. At least a portion of filter wall 24 includes a reactive material that alters concentration of at least one chemical species in the automobile exhaust. Moreover, in addition to the ability to promote changes in the gaseous composition of the automobile exhaust, filter wall 24 advantageously has sufficient porosity to allow the automobile exhaust gas composition to flow from exhaust gas entrance 12 to exhaust gas exit 14 as indicated by arrowed path 26 when automobile exhaust filter 10 is incorporated in an automobile exhaust system. Accordingly, the alteration of the automobile gas concentrations and the removal of particulate material typically occur simultaneously or nearly simultaneously.

The present invention is characterized in that the reactive material is present in an amount greater than about 50% of the weight of the filter wall. In certain variations of the present invention, the amount of reactive material is appreciably higher with both the bulk and surface regions of the filter walls being formed from the reactive material as set forth above.

As set forth above, at least a portion of filter wall 16 includes a reactive material that alters the concentration of one or more gaseous components. The present invention is not limited to any particular mechanism by which the reactive material alters the gaseous component concentrations. Potential mechanisms for altering the gaseous concentrations include, for example, adsorption, absorption, catalysis, and the like. As used herein, "reactive" does not imply any more reactivity than necessary to alter the gaseous concentrations (although additional reactivity may be present). Suitable reactive materials include, for example, the active materials that are used in sulfur traps or nitrogen traps (adsorption or absorption), in three way catalysts (catalysis), in selective catalytic reduction (SCR), and the like. The automobile exhaust filter of the invention is most advantageously used in diesel fuel automobiles that require the use of an SCR system for the removal of nitrogen oxides. The filter of the invention is useful in such application because of the rather significant amounts of particulate soot that are produced by diesel-fueled engines. An automobile filter of the present invention that combines particulate removing and SCR functionality is formed by incorporating a SCR composition into the construction of such filters. Virtually any SCR material may be used to form the filter wall. Such materials include, for example, a material selected from the group consisting of zeolites, base metal catalysts, precious metal, and combinations thereof. Suitable base metal catalysts include compounds having a metal selected from the group consisting of copper, iron, cerium, manganese, molybdenum, titanium, vanadium, molybdenum, tungsten, and combinations thereof. In another variation of the invention, the filter wall comprises a $NO_x$ trap composition. Again, virtually any type of $NO_x$ trap composition may be used. An example of a suitable $NO_x$ trap composition includes a precious metal, a $NO_x$ absorber material, and a support material such as alumina.

In order to function properly, the exhaust gas must be able to flow through the automobile filter of the invention at all operating temperatures and pressures found in an automobile exhaust. This characteristic is determined in most part by the porosity of the material forming the filter walls that are interposed between the exhaust gas entrances and exits. In order that the automobile filter of the invention does not impede exhaust flow, the filter should not cause a significantly higher backpressure than SCR systems and particulate traps currently used in automobile exhausts. Typically, the filter wall of the automobile exhaust filter of the invention has a sufficient porosity that the automobile exhaust filter induces a backpressure less than about 20 inches Hg. For example, in diesel-powered vehicles, the backpressure from the turbo outlet to tailpipe target may be considered. Back pressure limits are set using a combination of maximal turbo outlet temperatures, turbine efficiency, brake specific fuel consumption targets and max engine power rating by methods known to those skilled in the art. Typical ranges for a modern diesel engine equipped with an oxidation catalyst and a DPF will range from 1–2 inches Hg at near idle to 12 inches Hg at full load. European passenger car applications may allow 16–17 inches of backpressure Hg due to high turbo temperature limits. It should be appreciated that oil/fuel ash accumulation in the diesel particulate filter will cause backpressure to increase over the life of the vehicle. Finally, an increase of 3–4 inches Hg may be tolerated before the automobile exhaust filter of the invention needs to be serviced or replaced.

In a variation of the invention, the material forming the filter walls has a porosity from about 40% to about 55%. As used herein, porosity refers to the volume of pores in the material. Therefore, a porosity of 40% means that 40% of the volume comprises pores which do not contain solid material. Alternatively, the porosity of the material of the filter walls may be described in reference to the volume of the pores. Typically, the volume of the pores is less than about 0.02 cc/g with a diameter less than about 3 microns on average.

The automobile filter of the invention is made by any material forming process compatible with the reactive material of the invention. Such processes include, for example, extrusion and ceramic sintering.

Figure 2A:
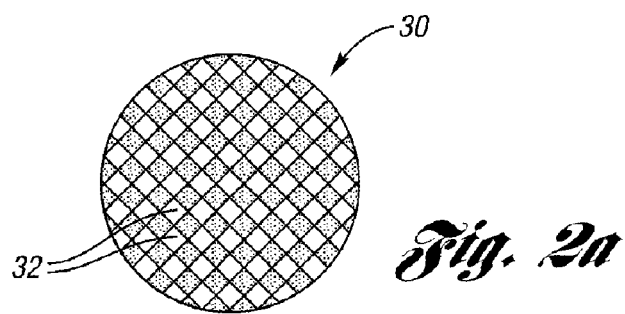
FIG. 2 is a schematic of an embodiment of the invention that utilizes a multichannel monolith to provide numerous entrances and exit channels.
Figure 2B:
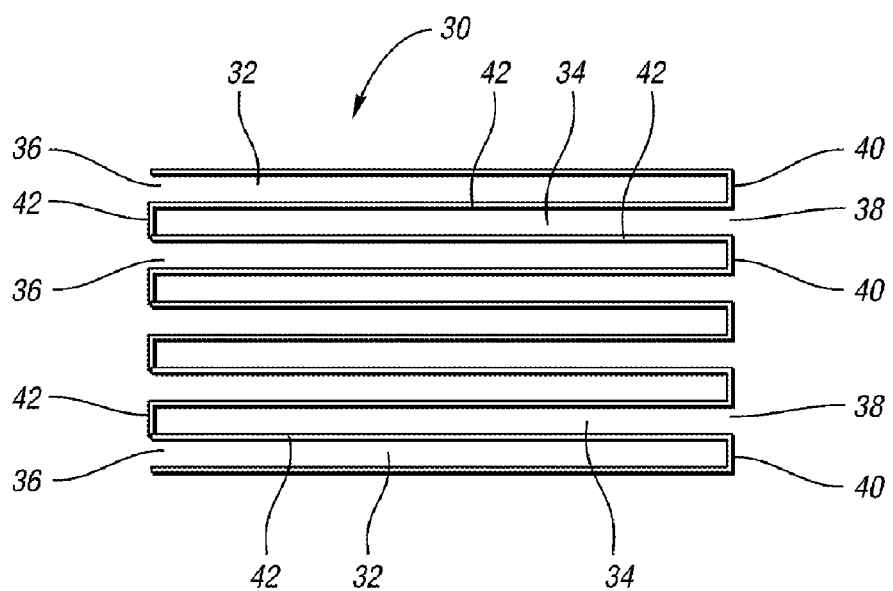

In another embodiment of the invention, the automobile exhaust filter of the invention includes a plurality of flow channels. Such channels are characteristic of the honeycombed monoliths used in automobile exhaust catalysts and filters. Unlike the typical catalyst applications where each channel of such monolith has an entrance and exit allowing a portion of the exhaust to flow completely through the channel, particulate filters have one end of the channel blocked off. With reference to FIG. 2, automobile exhaust filter 30 includes first plurality of flow channels 32 through which the automobile exhaust enters the automobile exhaust filter. Automobile exhaust filter 30 also includes second plurality of flow channels 34 from which the automobile exhaust exits the automobile exhaust filter 30. Automobile exhaust gas enters flow channels 32 through flow entrances 36 and exits from flow channels 34 through flow exits 38. Flow channels 32 are capped on an end with walls 40, and flow channels 34 are capped on an end with walls 42. Finally, flow channels 32 are separated from flow channels 34 by plurality of filter walls 44. Any given filter wall will separate at least one flow channel in the first plurality of flow channels from at least one flow channel in the second channel of flow channels. Each wall in the plurality of filter walls 36 includes a reactive material as set forth above that alters concentration of at least one chemical species in the automobile exhaust. The details of the porosity of the filter walls are the same as that set forth above. In general, each wall must have sufficient porosity to allow flow of the automobile exhaust gas composition from flow channels 32 to flow channels 34 while removing particulate matter from the automobile exhaust. Moreover, the reactive material is present in an amount greater than about 50% of the total weight of plurality of filter walls. In certain variations of the present invention, the amount of reactive material is appreciably higher with both the bulk and surface regions of the filter walls being formed from the reactive material as set forth above.

The automobile exhaust filter is made by any method that is capable of forming the reactive material or precursors to the reactive material into flow channels 32, 34 with the appropriate porosity. Typically, in addition to active ingredients that catalyze or trap various exhaust gas species the material from which the filter wall is made may include a support material such as cordierite. Such a support material may even be the major ingredient of the filter walls. The support material in general will disperse the reactive components and increase surface area. Useful fabrication techniques include extrusion as disclosed in U.S. Pat. No. 5,069,697. The entire disclosure of which is hereby incorporated by reference. In addition, high temperature ceramic sintering may be used to form the automobile exhaust filter of the invention. It should also be appreciated that after a honeycombed monolith (i.e., the automobile filter of the invention) is formed from a composition that includes the reactive material, the monolith will typically be encased in a metallic support for inclusion in an automobile exhaust system.

In another embodiment of the invention, a method for removing particulate matter from an automobile exhaust and altering the concentration of one or more gaseous components in the automobile exhaust is provided. In accordance with the method of the invention, an automobile exhaust is contacted with the automobile filters set forth above. Specifically, the method of the invention includes the step of flowing an automobile exhaust through a filter wall that is interposed between a filter entrance and exit. The filter accomplishes its dual function by utilizing the construction features as set forth above. For example, the filter wall has enough porosity to allow the exhaust to pass through at the typical temperatures and pressure present in an automobile exhaust while altering the concentration of at least one chemical species in the automobile exhaust. Advantageously, the method of the invention is used in diesel engine applications that typically require the use of SCR systems.

While the best mode for carrying out the invention has been described in detail, those familiar with the art to which this invention relates will recognize various alternative designs and embodiments for practicing the invention as defined by the following claims.

What is claimed is:

1. A method for removing particulate matter from an automobile exhaust which includes particulate matter and gaseous components, the method comprising:

flowing the automobile exhaust through a filter wall, the filter wall comprising a reactive material that alters concentration of at least one chemical species in the automobile exhaust, wherein the reactive material is present in an amount greater than about 50% of the weight of the filter wall and wherein the filter has sufficient porosity to allow flow of the automobile exhaust gas through the filter wall wherein the filter wall includes a bulk region and a surface region such that the bulk region comprises the reactive material.

2. The method of claim 1 wherein the surface region comprises the reactive material.

3. The method of claim 1 wherein the filter wall comprises a $NO_x$ trap composition.

4. The method of claim 1 wherein the filter wall comprises a sulfur trap composition.

5. The method of claim 1 wherein the filter wall comprises a three-way catalyst composition.

6. The method of claim 1 wherein the filter wall has a sufficient porosity that the automobile exhaust filter induces a back-pressure less than about 20 inches Hg.

7. The method of claim 1 wherein the filter wall comprises a SCR composition.

8. The method of claim 7 further comprising adding a reductant to the automobile exhaust prior to the step of flowing the automobile exhaust through the filter wall.

9. The method of claim 8 wherein the reductant comprises urea, ammonia, and combinations thereof.

10. An automobile exhaust filter for removing particulate matter from an automobile exhaust which includes particulate matter and gaseous components, the automobile exhaust filter comprising:

at least one exhaust gas entrance;

at least one exhaust gas exit; and a filter wall interposed between the exhaust gas entrance and the exhaust gas exit, the filter wall comprising a reactive material that alters concentration of at least one chemical species in the automobile exhaust, wherein the reactive material is present in an amount of at least 50% of the total weight of the filter wall and the filter wall has sufficient porosity to allow flow of the automobile exhaust gas composition from the exhaust gas entrance to the exhaust gas exit while removing particulate matter from the automobile exhaust wherein the filter wall includes a bulk region and a surface region such that the bulk region comprises the reactive material.

11. The automobile exhaust filter of claim 10 wherein the surface region comprises the reactive material.

12. The automobile exhaust filter of claim 10 wherein the filter wall comprises a sulfur trap composition.

13. The automobile exhaust filter of claim 10 wherein the filter wall comprises a three-way catalyst composition.

14. The automobile exhaust filter of claim 10 wherein the filter wall has a sufficient porosity that the automobile exhaust filter induces a backpressure less than about 20 inches Hg.

15. The automobile exhaust filter of claim 10 wherein the filter wall comprises a $NO_x$ trap composition.

16. The automobile exhaust filter of claim 15 wherein the $NO_x$ trap composition comprises:

a precious metal;

a $NO_x$ absorber material; and a support material.

17. The automobile exhaust filter of claim 10 wherein the filter wall comprises a SCR composition.

18. The automobile exhaust filter of claim 17 wherein the SCR composition comprises a zeolite.

19. The automobile exhaust filter of claim 17 wherein the SCR composition comprises a precious metal.

20. The automobile exhaust filter of claim 17 wherein the SCR composition comprises a base metal catalyst.

21. The automobile exhaust filter of claim 20 wherein the base metal catalyst comprises a compound having a metal selected from the group consisting of copper, iron, cerium, manganese, molybdenum, titanium, vanadium, molybdenum, tungsten, and combinations thereof.

22. An automobile exhaust filter for removing particulate matter from an automobile exhaust which includes particulate matter and gaseous components, the automobile exhaust filter comprising:
  a first plurality of flow channels through which the automobile exhaust enters the automobile exhaust filter;
  a second plurality of flow channels from which the automobile exhaust exits the automobile exhaust filter;
  a plurality of filter walls, each filter wall in the plurality of filter walls comprising a reactive material that alters concentration of at least one chemical species in the automobile exhaust and separating at least one flow channel in the first plurality of flow channels from at least one flow channel in the second channel of flow channels, wherein the reactive material is present in an amount greater than about 50% of the total weight of the plurality of filter walls and wherein each filter wall has sufficient porosity to allow flow of the automobile exhaust gas composition from the exhaust gas entrance to the exhaust gas exit while removing particulate matter from the automobile exhaust, wherein each filter wall includes a bulk region and a surface region such that the bulk region comprises a first portion of the reactive material.

23. The automobile exhaust filter of claim 22 wherein the surface region comprises a second portion of the reactive material.

24. The automobile exhaust filter of claim 22 wherein the filter wall comprises a SCR composition.

25. The automobile exhaust filter of claim 22 wherein the filter wall comprises a $NO_x$ trap composition.

26. The automobile exhaust filter of claim 22 wherein the filter wall comprises a sulfur trap composition.

27. The automobile exhaust filter of claim 22 wherein the filter wall comprises a three-way catalyst composition.

28. The automobile exhaust filter of claim 22 wherein the filter wall has a sufficient porosity that the automobile exhaust filter induces a backpressure less than about 20 inches Hg.

* * * * *